United States Patent
Ollander et al.

(10) Patent No.: US 10,746,313 B2
(45) Date of Patent: Aug. 18, 2020

(54) NEAR FIELD RF POWERED ELECTRONIC VALVE ACTUATOR

(71) Applicant: Flowserve Management Company, Irving, TX (US)

(72) Inventors: Mark D Ollander, Forest, VA (US); Daniel E Carlson, Rustburg, VA (US); Michael Adam Rumore, Lynchburg, VA (US); Paul Ralph Carpenter, Lynchburg, VA (US)

(73) Assignee: Flowserve Management Company, Irving, TX (US)

( * ) Notice: Subject to any disclaimer, the term of this patent is extended or adjusted under 35 U.S.C. 154(b) by 71 days.

(21) Appl. No.: 16/165,040

(22) Filed: Oct. 19, 2018

(65) Prior Publication Data
US 2020/0124197 A1    Apr. 23, 2020

(51) Int. Cl.
*F16K 31/06* (2006.01)
*F16K 31/02* (2006.01)
(Continued)

(52) U.S. Cl.
CPC .......... *F16K 31/02* (2013.01); *F16K 31/0675* (2013.01); *H01F 7/064* (2013.01); *H01F 38/14* (2013.01)

(58) Field of Classification Search
CPC ...... F16K 31/02; F16K 31/0675; H01F 7/064; H01F 38/14
See application file for complete search history.

(56) References Cited

U.S. PATENT DOCUMENTS

| | | | | |
|---|---|---|---|---|
| 4,915,347 A | * | 4/1990 | Iqbal | E03C 1/057 |
| | | | | 137/605 |
| 6,301,128 B1 | * | 10/2001 | Jang | H02J 5/005 |
| | | | | 363/17 |

(Continued)

FOREIGN PATENT DOCUMENTS

| | | |
|---|---|---|
| KR | 20019978 Y1 | 10/2000 |
| KR | 1020070110955 A | 11/2007 |
| KR | 101136932 B1 | 4/2012 |

OTHER PUBLICATIONS

PCT International Search Report and Written Opinion for U.S. Appl. No. PCT/US2019/055201, 12 pages.

*Primary Examiner* — Matthew W Jellett
(74) *Attorney, Agent, or Firm* — Maine Cernota & Rardin

(57) ABSTRACT

A near field energized electronic valve actuator includes a power receiver that enables powering of control electronics using wireless RF energy received from an external device such as a laptop computer or smart cellular telephone handset when conventional power is unavailable to the actuator, thereby enabling exchange of data between the external device and the control electronics. Embodiments further enable data exchange between the control electronics and non-volatile memory during the wireless energization. The data can be exchanged, for example, during initial configuration of the actuator before customer delivery, during an unpowered maintenance period to retrieve operational log information stored by the control electronics, and/or to retrieve valve position information measured by a position sensor and/or fault-relevant data from the actuator when power has been interrupted due to an actuator or valve failure.

18 Claims, 2 Drawing Sheets

(51) Int. Cl.
*H01F 38/14* (2006.01)
*H01F 7/06* (2006.01)

(56) References Cited

U.S. PATENT DOCUMENTS

| | | | | |
|---|---|---|---|---|
| 6,837,271 | B1* | 1/2005 | Saint | G01M 3/2807 |
| | | | | 137/460 |
| 7,621,293 | B2* | 11/2009 | Snowbarger | F16K 37/0091 |
| | | | | 137/487.5 |
| 8,333,361 | B2* | 12/2012 | McTargett | E03C 1/055 |
| | | | | 251/129.04 |
| 8,573,241 | B2* | 11/2013 | Esposito | F16K 7/14 |
| | | | | 137/14 |
| 8,678,346 | B2* | 3/2014 | Haller | H01F 7/064 |
| | | | | 251/129.04 |
| 8,955,821 | B2* | 2/2015 | Okuda | F16K 31/12 |
| | | | | 251/129.01 |
| 2004/0145342 | A1* | 7/2004 | Lyon | H02J 7/025 |
| | | | | 320/108 |
| 2011/0004186 | A1 | 1/2011 | Butterfield | |
| 2012/0232708 | A1 | 9/2012 | Ensworth et al. | |

* cited by examiner

NEAR FIELD RF POWERED ELECTRONIC VALVE ACTUATOR

FIELD OF THE INVENTION

The invention relates to position control devices that control actuators such as valve actuators, and more particularly, to electrically driven valve actuators.

BACKGROUND OF THE INVENTION

Control valves and valve actuators find wide application in a number of industries, such as power generation of all types, petroleum and petrochemicals, textiles, paper, and food processing. Control valves are often used to directly and/or indirectly control temperatures, pressures, and flows within an open or closed-loop system. The operation of a control valve typically involves positioning a plug relative to a stationary seat within the valve, whereby the actuator is directly coupled to the valve plug via a stem that is used to move the valve plug to the desired control position. The action of the valve stem can be either linear or rotary, depending on whether the valve is a liner or rotary valve.

It should be noted that frequent reference is made herein to "torque" applied by an actuator to a valve stem. However, it will be understood that, unless otherwise required by context, the term "torque" as used herein also refers to linear displacement force, according to whether the implementation of the valve actuator is rotary or linear. Similarly, valve actuation "speed" can refer to either linear or rotational speed, according to the configuration of the valve stem and actuator. Furthermore, it should be understood that the term valve "stem" as used herein is not limited to rotationally operated valve stems, but refers generically to any mechanical element of a valve that is manipulated by a valve actuator so as to adjust a degree to which the valve is open or closed.

In the simplest case, a valve actuator can be purely mechanical. However, it is often convenient to pneumatically or electrically control a valve actuator, so as to provide remote control and/or monitoring. This can allow the valve to be located in a remote, dangerous, flammable, and/or toxic environment, and/or in a location that is inconvenient or difficult to reach.

Due to their potential implementation in remote and/or harsh environments, as well as overall long-term reliability considerations, many remotely controlled actuators include only a few, well-sealed penetrations of their housing, typically for main power input, remote data communication, and mechanical connection to the valve.

The remote control of a valve actuator can be "manual," for example by adjustment of a potentiometer. In other cases the function of the valve actuator is includes onboard control electronics that enable the actuator to perform more complex tasks without requiring immediate, local, human intervention, such as process control, regulation, implementation of speed/torque profiles, and/or emergency shut-off. Typically, the control electronics in such actuators are able to communicate with and be controlled by remote laptops and/or other such devices.

Electronically controlled actuators typically require application settings, speed/torque profiles, and/or other data to be entered into their control electronics prior to operation, so that the actuator can function correctly. This data can include an open position, a close position, a torque trip limit (to protect against applying a torque to the valve that exceeds its operational limitations), an operating speed or speed profile, and/or option settings for communication and for input and output of data, to name a few.

Typically, an electronically controlled actuator is powered by an external power source that is provided to the actuator at the installation site, such as a 3 phase AC power line, a single phase AC power line, or a 24-250 V DC power system. Once the control electronics are powered up and energized, the actuator is ready for configuration information to be entered and/or stored data to be retrieved via a local control station or an external device such as a laptop computer.

In addition to configuration information, status and alarm information can be retrieved from the actuator control electronics, for example when troubleshooting a system failure. Once the actuator is powered, such status and alarm information can be displayed on a local control display, if available, or remotely captured on a device such as a laptop computer.

Power must be supplied to the control electronics before any of these data-exchange functions can occur. However, there can be circumstances where data entry into, or data retrieval from, an electronic actuator is desired, but it is not convenient or not possible to connect a power source to the actuator. Some examples of situations where this can occur are:

During preparation of a newly purchased actuator for delivery to a user.

During a maintenance cycle of the actuator.

If user-supplied power fails at the end-user installation.

In these situations, where local power is not available to power the actuator, it can be difficult or impossible to exchange data with the control electronics of an electric actuator.

What is needed, therefore, is an apparatus and method for exchanging data with control electronics of an electronic valve actuator when it is inconvenient or impossible to connect the actuator to a conventional power source.

SUMMARY OF THE INVENTION

The present invention is an apparatus and method for exchanging data with control electronics of a valve actuator when it is inconvenient or impossible to connect the actuator to a conventional power source. According to the invention, the actuator includes an RF power receiver that is configured to receive radio frequency energy from an external communication device, and to deliver the energy to the actuator control electronics, thereby enabling the control electronics to wirelessly exchange status information, such as valve position and/or currently applied torque, with the external communication device.

The actuator is further able to accept commands from the external communication device, store data in the non-volatile memory of the actuator, and report data to the external communication device that has been previously stored in non-volatile memory. In embodiments, the external communication device is a device such as a laptop computer or cellular telephone handset that is configured for "near field" communication. In some of these embodiments, the external communication device can function as a temporary, local diagnosis and control panel for the valve actuator.

In embodiments, the actuator is enclosed within a non-conducting housing such as a plastic housing, or a non-conducting panel is provided proximate an energy receiving portion of the power receiver. For example, an aluminum housing can be provided with a non-conducting window for RF permeability.

In various embodiments, the control electronics are configured to receive and store configuration instructions and/or parameters, for example during initial configuration before delivery to a user. In other embodiments, the control electronics are configured to maintain a log containing operational data reflective of the operational health of the actuator and/or associated valve, and to retrieve and exchange data from the log with the external communication device during a maintenance period when conventional power is not available to the actuator. In still other embodiments, the control electronics are configured to report current status, and/or to store and report a status history and/or other fault-relevant data that can be helpful in determining status and diagnosing problems when a failure of the actuator and/or of associated devices has occurred and power has consequently been shut off.

A first general aspect of the present invention is a near field RF powered electronic valve actuator. The valve actuator includes a housing, control electronics contained within the housing, and a near field power receiver located within the housing in data and power communication with the control electronics. The near field power receiver including an antenna configured, when electrical power is not applied to a power input port of the valve actuator, to receive radio frequency energy from an external device located proximal to the near field power receiver but outside of the housing. The near field power receiver being configured to convey said received power to the control electronics, to exchange data with the control electronics, and to wirelessly exchange data with the external device.

Embodiments further include a valve position sensor configured to provide information relevant to the valve position to the control electronics, the control electronics being thereby able to wirelessly communicate the information relevant to the valve position to the external device.

Any of the above embodiments, can further include non-volatile memory in data communication with the control electronics, the control electronics being thereby able to wirelessly exchange data between the non-volatile memory and the external device.

In any of the above embodiments, the housing can be made from a material that does not conduct electricity. In some of these embodiments, the housing is a plastic housing.

In any of the above embodiments, the housing can be a metal housing, and the housing can further comprise a non-conductive section that does not conduct electricity, said non-conductive section being located proximal to the antenna of the near field power receiver, thereby enabling the antenna to receive the radio frequency energy from the external device.

In any of the above embodiments, the near field power receiver can be configured to receive power and exchange data with the external device via near field communication.

In any of the above embodiments, the actuator can be able to wirelessly exchange data with the external device when electrical power is applied to the power input port of the valve actuator.

A second general aspect of the present invention is a method of exchanging data with control electronics of a valve actuator when electrical power is not applied to a power input port of the valve actuator. The method includes:

a. placing an external device in close proximity to a near field power receiver of the actuator, whereby by the external device and the near field power receiver are separated by a section of an actuator housing that does not conduct electricity;

b. transmitting by the external device of radio frequency energy to the near field power receiver;

c. converting by the near field power receiver of the received radio frequency energy into electrical energy;

d. transferring of the electrical energy from the near field power receiver to the control electronics; and e. while energized by the electrical energy, wirelessly exchanging by the control electronics of data with the external device.

In embodiments, the external device and the near field power receiver communicate with each other using near field communication. In some of these embodiments, the actuator housing is made from a material that does not conduct electricity. In any of these embodiments, the housing can be made from metal, except for the section that separates the external device from the near field power receiver. Any of these embodiments can further include, while the control electronics are energized by the electrical energy, exchanging by the control electronics of data with non-volatile memory of the actuator. In some of these embodiments, the exchange of data between the control electronics and the external device includes communication of configuration parameters to the control electronics to be saved in the non-volatile memory. In any of these embodiments, the exchange of data between the control electronics and the external device can include communication to the external device of data from a maintenance log maintained in the non-volatile memory that is reflective of the operational health of the actuator and/or of an associated valve. And in any of these embodiments the exchange of data between the control electronics and the external device can include communication of fault-relevant data stored in the non-volatile memory, the method further comprising using the fault relevant data to at least one of determine a status of the actuator and diagnose a failure of the actuator or a failure of a valve that is controlled by the actuator.

In any of the above embodiments wherein the external device and the near field power receiver communicate with each other using near field communication, the exchange of data between the control electronics and the external device can take place during a maintenance period when conventional power is not available to the actuator. And any of these embodiments can further include wirelessly exchanging by the control electronics of data with the external device when electrical power is applied to the power input port of the valve actuator.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for exchanging data with control electronics of a valve actuator when it is inconvenient or impossible to connect the actuator to a conventional power source.

Figure 1:
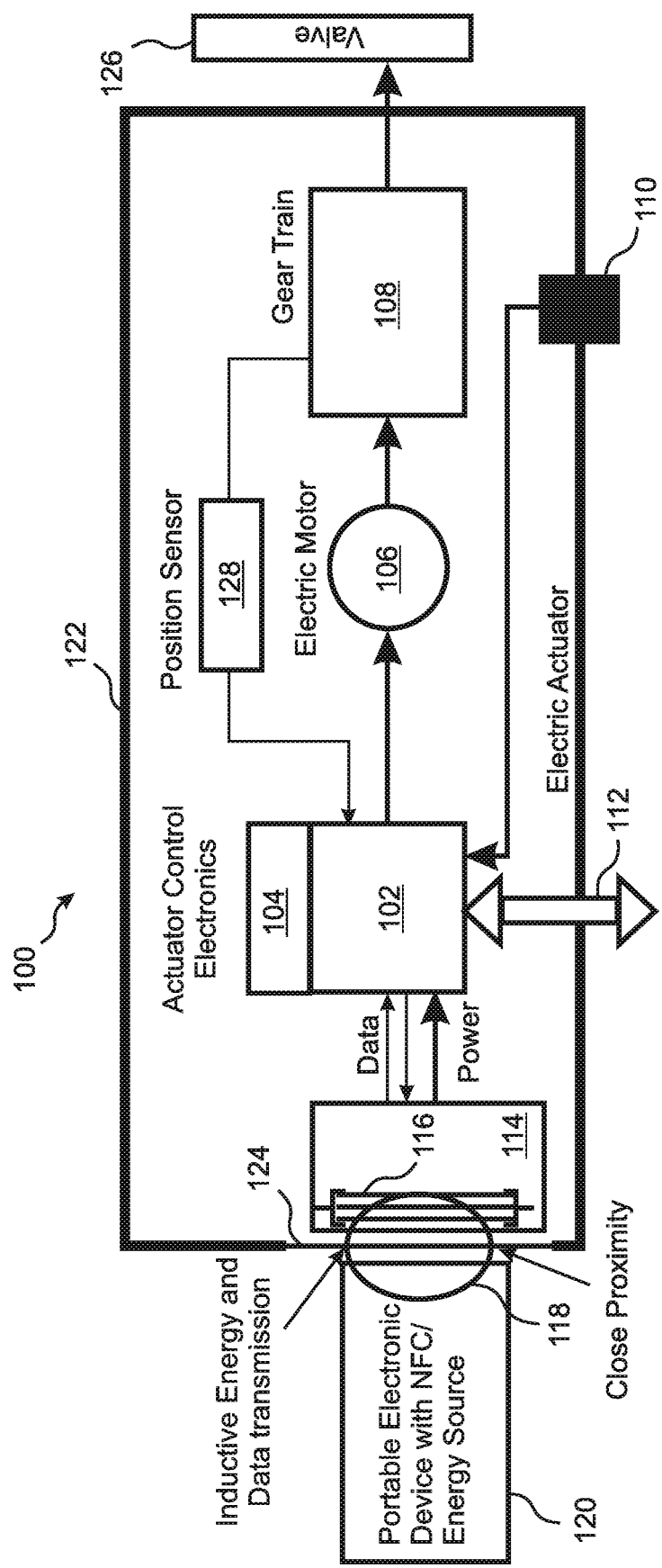
FIG. 1 is a block diagram illustrating an embodiment of the actuator of the present invention.

With reference to FIG. 1, the disclosed actuator 100 includes control electronics 102 that are in data communication with non-volatile memory 104. In the embodiment of FIG. 1, the actuator 100 is an electronic actuator and the control electronics are in control communication with an electric motor 106 that is linked by a gear assembly 108 to valve, and is configured to apply a linear or rotary actuating force to the valve 126. In similar embodiments, the actuator is a pneumatic actuator, whereby the electric motor 106 and gears 108 of FIG. 1 are replaced by a pneumatic piston and other pneumatic control and/or drive apparatus. The embodiment of FIG. 1 further includes a valve position sensor 128 that is able to obtain information regarding the current position of the valve, as indicated by a current status of the gear train 108.

The actuator 100 of FIG. 1 further includes a power input 110, to which a power source that is provided at the installation site is connected. In embodiments, the power source is a single or three phase AC power line, or a DC power input from a DC power source. The actuator 100 further includes a communication port 112 for wired and/or wireless communication with external devices (not shown). In various embodiments, the external devices can be local and/or remote, and the communication can be by any means known in the art, such as by a dedicated wire cable, or by wired or wireless telephony or via a wired or wireless network such as the internet. In all cases, however, communication over the communication port 112 requires that power is supplied to the power input 110.

According to the present invention, the actuator 100 further comprises a wireless power receiver 114 that is in power and data communication with the control electronics 102. The power receiver 114 includes an antenna 116 that is configured to receive radio frequency energy 118 from an external communication device 120 when the external communication device 120 is placed in close proximity with the antenna 116. When power is not supplied to the power input 110, and the external communication device 120 is placed in close proximity with the antenna 116 of the power receiver 114, sufficient radio frequency energy can be delivered wirelessly by the external communication device 120 to the power receiver 114, and from thence transferred to the control electronics 102, to enable the control electronics 102 to wirelessly exchange data with the external communication device 120, including status information, such as current valve position (as indicated by the position sensor 128) and applied torque, command input, and logged information retrieved from the non-volatile memory 104.

In embodiments, the actuator is enclosed in a non-conductive housing 122, so as to enable the RF energy to reach the antenna 116 of the power receiver 114. In the embodiment of FIG. 1, the actuator is enclosed in a metal housing 122 that includes a non-conducting panel 124 such as a plastic panel proximate the antenna 116.

In embodiments, the external communication device 120 can be a laptop computer or cellular telephone handset. In various embodiments, the external communication device is configured for "near field" communication with remote power transfer. In some embodiments, the external communication device functions as a local, wireless control and status panel for the actuator.

In various embodiments, the control electronics 102 are configured to receive and store configuration instructions and/or parameters in the non-volatile memory 104, for example during initial configuration before delivery to a user. In other embodiments, the control electronics 102 are configured to maintain a log containing operational data reflective of the operational health of the actuator and/or associated valve, and to retrieve and exchange data from the log with the external communication device 120 when conventional power is not available to the actuator, for example during a maintenance period.

In still other embodiments, the control electronics 102 are configured to record and store status and other fault-relevant data that can be helpful in determining status and diagnosing problems when a failure of the actuator 100 and/or of associated devices has occurred, and the power that is normally delivered to the power input 110 has consequently been shut off, and to communicate the fault-relevant data to the external controller 120.

In various embodiments, the control electronics 102 are able to communicate with the external communication device 120 even when the actuator 100 is energized by the main power input 110, thereby enabling the external communication device 120 to serve as a temporary, local status display and control unit.

Figure 2:
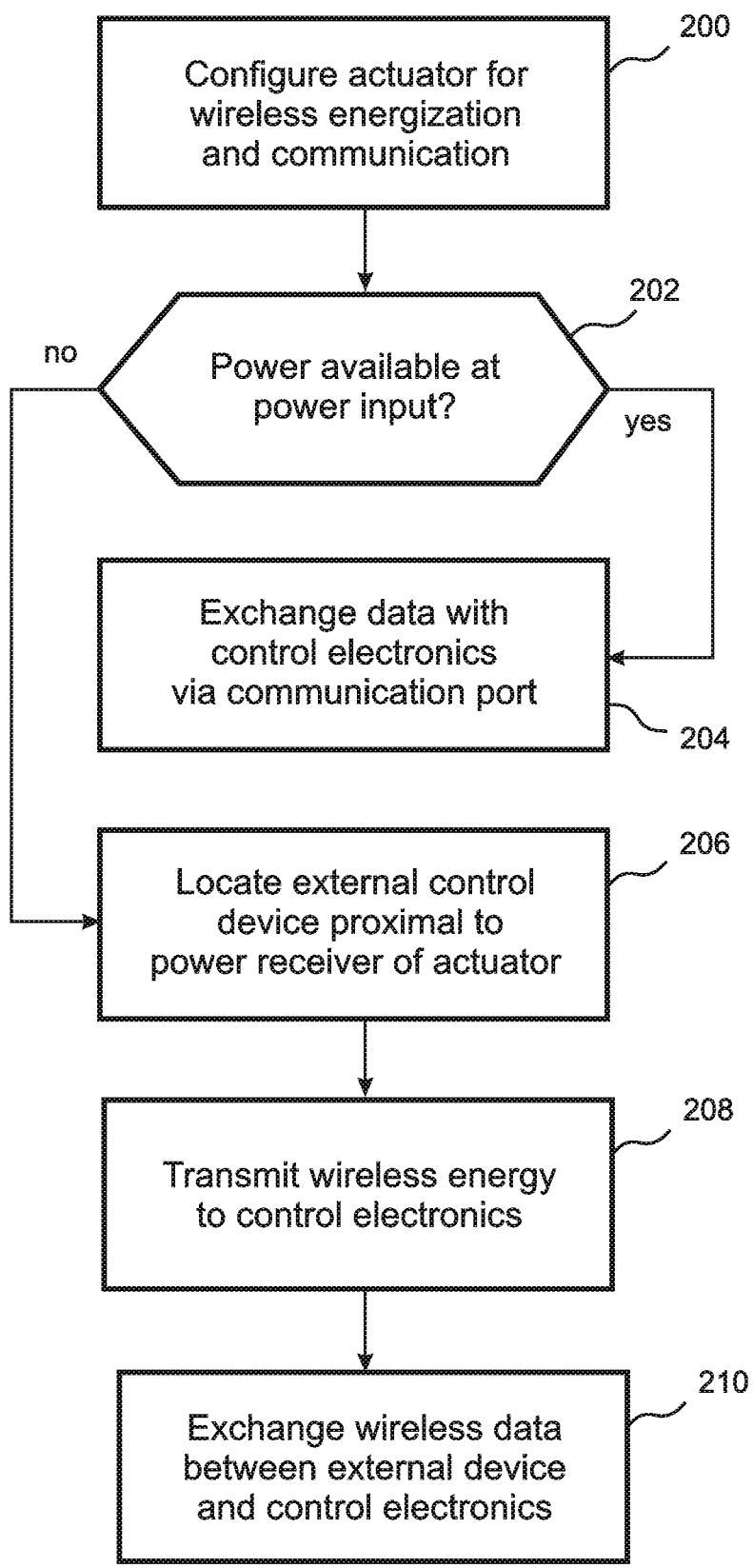
FIG. 2 is a flow diagram illustrating a method embodiment of the present invention.

With reference to FIG. 2, embodiments of the method of the present invention include configuring a valve actuator to for wireless energization and communication 200. When power is connected to the power input 202, then data can be exchanged with the control electronics via the communication port of the actuator 204. However, when it is not convenient or not possible to apply power to the power input of the actuator 202, then the method includes placing an external communication device proximate the power receiver of the actuator 206 transmitting of wireless energy from the external communication device to the actuator 208, and exchanging data between the near field enabled external communication device and the control electronics of the actuator 210.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:
1. A near field RF powered electronic valve actuator, comprising:
a housing;
a valve actuating mechanism contained within the housing;

control electronics contained within the housing, the control electronics being distant from the valve actuating mechanism, and being configured to control actuation of a valve by the valve actuating mechanism;

a power input port configured to provide operating power to the valve actuating mechanism and to the control electronics; and a near field power receiver located within the housing in data and power communication with the control electronics, the near field power receiver including an antenna configured, when electrical power is not applied to the power input port, to receive radio frequency energy from an external device located proximal to the near field power receiver but outside of the housing, said near field power receiver being configured to convey said received power to the control electronics as substitute operating power for the control electronics, thereby enabling the control electronics to wirelessly exchange data with the external device.

2. The actuator of claim 1, further comprising a valve position sensor configured to provide information relevant to a valve position to the control electronics, the control electronics being thereby able to wirelessly communicate the information relevant to the valve position to the external device.

3. The actuator of claim 1, further comprising non-volatile memory in data communication with the control electronics, the control electronics being thereby able to wirelessly exchange data between the non-volatile memory and the external device.

4. The actuator of claim 1, wherein the housing is made from a material that does not conduct electricity.

5. The actuator of claim 4, wherein the housing is a plastic housing.

6. The actuator of claim 1, wherein the housing is a metal housing, and the housing further comprises a non-conductive section that does not conduct electricity, said non-conductive section being located proximal to the antenna of the near field power receiver, thereby enabling the antenna to receive the radio frequency energy from the external device.

7. The actuator of claim 1, wherein the near field power receiver is configured to receive power from the external device via near field communication.

8. The actuator of claim 1, wherein the actuator is able to wirelessly exchange data with the external device when electrical power is applied to the power input port of the valve actuator.

9. A method of exchanging data with control electronics of a valve actuator when electrical power is not applied to a power input port of the valve actuator, the control electronics being distant from a valve actuating mechanism of the valve actuator and being configured to control actuation of a valve by the valve actuating mechanism, the method comprising, while the electrical power is not applied to the power input port:

placing an external device in close proximity to a near field power receiver of the valve actuator, whereby the external device and the near field power receiver are separated by a section of an actuator housing that does not conduct electricity;

transmitting of radio frequency energy by the external device to the near field power receiver;

converting of the received radio frequency energy into electrical energy by the near field power receiver;

transferring of the electrical energy from the near field power receiver to the control electronics; and while the control electronics are energized by the electrical energy from the near field power receiver, the control electronics wirelessly exchanging data with the external device.

10. The method of claim 9, wherein the external device and the near field power receiver communicate with each other using near field communication.

11. The method of claim 9, wherein the actuator housing is made from a material that does not conduct electricity.

12. The method of claim 9, wherein the housing is made from metal, except for the section that separates the external device from the near field power receiver.

13. The method of claim 9, further comprising, while the control electronics are energized by the electrical energy, the control electronics exchanging data with non-volatile memory of the actuator.

14. The method of claim 13, wherein the exchange of data between the control electronics and the external device includes communication of configuration parameters to the control electronics to be saved in the non-volatile memory.

15. The method of claim 13, wherein the exchange of data between the control electronics and the external device includes communication to the external device of data from a maintenance log maintained in the non-volatile memory that is reflective of the operational health of the actuator and/or of an associated valve.

16. The method of claim 13, wherein the exchange of data between the control electronics and the external device includes communication of fault-relevant data stored in the non-volatile memory, the method further comprising using the fault relevant data to at least one of determine a status of the actuator and diagnose a failure of the actuator or a failure of a valve that is controlled by the actuator.

17. The method of claim 9, wherein the exchange of data between the control electronics and the external device takes place during a maintenance period when conventional power is not available to the power input port of the valve actuator.

18. The method of claim 9, further comprising the control electronics also wirelessly exchanging data with the external device when electrical power is applied to the power input port of the valve actuator.

* * * * *